United States Patent
Hain et al.

(10) Patent No.: US 8,015,686 B2
(45) Date of Patent: Sep. 13, 2011

(54) METHOD AND DEVICE FOR SUPPLY OF CONNECTING ELEMENTS TO A PROCESSING APPARATUS

(75) Inventors: Jochen Hain, Wissenbach (DE); Stefan Lippert, Hungen (DE); Alexander Pohl, Pohlheim (DE); Joachim Moser, Alsfeld (DE); Thomas Ziegert, Huttenberg (DE)

(73) Assignee: Newfrey LLC, Newark, DE (US)

( * ) Notice: Subject to any disclaimer, the term of this patent is extended or adjusted under 35 U.S.C. 154(b) by 1301 days.

(21) Appl. No.: 11/510,856

(22) Filed: Aug. 25, 2006

(65) Prior Publication Data
US 2007/0049067 A1    Mar. 1, 2007

(30) Foreign Application Priority Data
Aug. 31, 2005   (DE) .......................... 10 2005 041 534

(51) Int. Cl.
*B23P 11/00*   (2006.01)
(52) U.S. Cl. .................. 29/432.2; 29/524.1; 29/525.06; 29/595; 219/98; 227/139
(58) Field of Classification Search .................. 29/432.2, 29/524.1, 525.06, 595; 227/139; 219/98
See application file for complete search history.

(56) References Cited

U.S. PATENT DOCUMENTS

| | | |
|---|---|---|
| 1,859,081 A | 5/1932 | Elsner |
| 2,216,403 A | 10/1940 | Oeckl et al. |
| 2,330,052 A | 9/1943 | Henry et al. |
| 2,493,868 A | 1/1950 | Griffin |
| 2,544,165 A | 3/1951 | Krasnow |
| 2,662,626 A | 12/1953 | Graham et al. |
| 2,706,504 A | 4/1955 | Moore |
| 2,755,538 A | 7/1956 | Kirsch |

(Continued)

FOREIGN PATENT DOCUMENTS
CA    1255880    6/1989
(Continued)

OTHER PUBLICATIONS

Opposition filed by third party (Bollhoff), 251 pages.

*Primary Examiner* — Derris H Banks
*Assistant Examiner* — Azm Parvez
(74) *Attorney, Agent, or Firm* — Harness, Dickey & Pierce, P.L.C.

(57) ABSTRACT

In a method of supplying connecting elements to a processing unit, in which the connecting elements are placed in readiness by a supply unit and conveyed individually by a passage to a loading device arranged on the processing unit, the conveyance of the connecting elements takes place in two separate steps, a first step in which the connecting elements are individually conveyed by the supply unit into a intermediate reservoir arranged near the loading device, and a second step in which a single connecting element at a time is conveyed from the intermediate reservoir into the loading device of the processing unit. Specifically, at least two different connecting elements are picked up by the intermediate reservoir, and of the several connecting elements accommodated in the intermediate reservoir an arbitrary one determined by the processing operation is selected for the second step and conveyed to the loading device. A device for practicing the method includes an intermediate reservoir preceding the loading device comprising two storage chambers to accommodate two different connecting elements supplied by the passage, the storage chambers having an entrance opening and an exit opening alternately connectable to the associated segment of the passage.

29 Claims, 3 Drawing Sheets

U.S. PATENT DOCUMENTS

| | | | |
|---|---|---|---|
| 3,279,045 A | 10/1966 | Dixon | |
| 3,289,884 A | 12/1966 | Klancnik | |
| 3,339,799 A | 9/1967 | Spisak | |
| 3,561,641 A | 2/1971 | Kerr | |
| 3,623,208 A | 11/1971 | Hofmann | |
| 3,750,257 A | 8/1973 | Berecz | |
| 3,789,490 A | 2/1974 | Kohart | |
| 4,005,519 A | 2/1977 | Di Maio et al. | |
| 4,047,281 A | 9/1977 | Di Maio et al. | |
| 4,075,748 A | 2/1978 | Buttriss | |
| 4,220,275 A | 9/1980 | Hametner et al. | |
| 4,345,677 A | 8/1982 | Shinjo | |
| 4,383,359 A | 5/1983 | Suzuki et al. | |
| 4,463,888 A | 8/1984 | Geist et al. | |
| 4,527,326 A | 7/1985 | Kohno et al. | |
| 4,594,764 A | 6/1986 | Yamamoto | |
| 4,604,889 A | 8/1986 | Sukharevsky | |
| 4,616,411 A | 10/1986 | Suzuki et al. | |
| 4,620,656 A | 11/1986 | McClay et al. | |
| 4,625,903 A | 12/1986 | Becht | |
| 4,630,460 A | 12/1986 | Mauer | |
| 4,633,560 A | 1/1987 | Muller | |
| 4,643,344 A | 2/1987 | Kaita et al. | |
| 4,692,983 A | 9/1987 | Kristola et al. | |
| 4,715,114 A | 12/1987 | Yajima | |
| 4,729,163 A | 3/1988 | Muller et al. | |
| 4,765,057 A | 8/1988 | Muller | |
| 4,773,156 A | 9/1988 | Kurita | |
| 4,782,588 A | 11/1988 | Jangaard | |
| 4,801,043 A | 1/1989 | Cindric | |
| 4,815,343 A | 3/1989 | Sofinowski | |
| 4,819,856 A | 4/1989 | Davern et al. | |
| 4,852,376 A | 8/1989 | Suhov | |
| 4,885,836 A | 12/1989 | Bonomi et al. | |
| 4,901,431 A | 2/1990 | Gast | |
| 4,960,360 A | 10/1990 | Giannuzzi et al. | |
| 5,192,012 A | 3/1993 | Schafer et al. | |
| 5,193,729 A | 3/1993 | Dewey et al. | |
| 5,201,892 A | 4/1993 | Salter | |
| 5,206,984 A | 5/1993 | Matumoto et al. | |
| 5,216,819 A | 6/1993 | Givler | |
| 5,231,747 A | 8/1993 | Clark et al. | |
| 5,236,341 A | 8/1993 | Stafford | |
| 5,259,104 A | 11/1993 | Givler | |
| 5,299,351 A | 4/1994 | Takahashi et al. | |
| 5,360,137 A | 11/1994 | Shinjo et al. | |
| 5,375,754 A | 12/1994 | Botha et al. | |
| 5,398,860 A | 3/1995 | Edwards | |
| 5,472,087 A | 12/1995 | Rink et al. | |
| 5,579,975 A | 12/1996 | Moorman | |
| 5,640,758 A | 6/1997 | Roessler et al. | |
| RE35,619 E | 10/1997 | Muller | |
| 5,752,305 A | 5/1998 | Cotterill et al. | |
| 5,758,798 A | 6/1998 | Duffy et al. | |
| 5,779,127 A | 7/1998 | Blacket et al. | |
| 5,810,239 A | 9/1998 | Stich | |
| 5,813,114 A | 9/1998 | Blacket et al. | |
| 5,897,045 A | 4/1999 | Olvera et al. | |
| 6,260,734 B1 | 7/2001 | Auriol et al. | |
| 6,276,050 B1 | 8/2001 | Mauer et al. | |
| 6,347,449 B1 | 2/2002 | Calkins et al. | |
| 6,388,224 B1 | 5/2002 | Torvinen | |
| 6,398,096 B1 | 6/2002 | Lang | |
| 6,502,008 B2 | 12/2002 | Maurer et al. | |
| 6,676,000 B2 | 1/2004 | Lang et al. | |
| 6,692,213 B1 * | 2/2004 | Butler | 414/412 |
| 6,796,454 B1 | 9/2004 | Matthews et al. | |
| 6,892,921 B2 * | 5/2005 | Beville | 227/109 |
| 6,968,939 B1 | 11/2005 | Mauer et al. | |
| 7,024,270 B2 | 4/2006 | Mauer et al. | |
| 2002/0014102 A1 | 2/2002 | Kondo et al. | |
| 2002/0029450 A1 | 3/2002 | Kondo | |
| 2004/0037634 A1 | 2/2004 | Muller et al. | |
| 2004/0107557 A1 | 6/2004 | Morris et al. | |
| 2004/0111878 A1 | 6/2004 | Naito | |
| 2004/0167660 A1 | 8/2004 | Mauer et al. | |
| 2004/0216304 A1 | 11/2004 | Naito | |
| 2006/0059678 A1 | 3/2006 | Mauer et al. | |
| 2006/0151442 A1 | 7/2006 | Schmitt et al. | |

FOREIGN PATENT DOCUMENTS

| | | |
|---|---|---|
| CH | 563841 | 7/1975 |
| DE | 744513 | 1/1944 |
| DE | 2 403 904 | 8/1974 |
| DE | 3447006 | 7/1985 |
| DE | 3448219 | 5/1990 |
| DE | 4310953 | 10/1994 |
| DE | 19731344 | 12/1998 |
| DE | 19756798 | 6/1999 |
| DE | 100 64 241 | 7/2002 |
| EP | 903055887 | 5/1990 |
| EP | 0 511 093 | 10/1992 |
| EP | 0511093 | 10/1992 |
| EP | 0 715 924 | 6/1996 |
| EP | 1 116 678 | 7/2001 |
| EP | 0 922 538 | 5/2004 |
| FR | 1230342 | 9/1960 |
| FR | 2 662622 | 12/1991 |
| GB | 2 285 405 | 7/1995 |
| JP | 57156174 | 9/1982 |
| JP | 61109644 | 7/1986 |
| JP | 61109646 | 7/1986 |
| JP | 4028926 | 3/1992 |
| JP | 6218637 | 8/1994 |
| JP | 8229752 | 2/1995 |
| JP | 9183022 | 7/1997 |
| WO | WO 00/07751 | 2/2000 |

* cited by examiner

METHOD AND DEVICE FOR SUPPLY OF CONNECTING ELEMENTS TO A PROCESSING APPARATUS

CROSS-REFERENCE TO RELATED APPLICATIONS

This application claims the benefit of German Application No. DE 10 2005 041 534.2 filed Aug. 31, 2005. The disclosure of the above application is incorporated herein by reference.

BACKGROUND AND SUMMARY

The invention relates to a method of supplying connecting elements to a processing apparatus, in which the connecting elements are placed in readiness by a supplying apparatus and individually conveyed to a loading device arranged on the processing apparatus. The invention relates further to a device for supply of connecting elements to a processing apparatus having a supply device for placing connecting elements in readiness, a loading device arranged on the processing apparatus and a conveyor passage connecting the supply unit to the loading device.

The mechanical automatic processing of connecting elements, for example the setting of rivets, the tightening of screws or the welding on of studs, requires a rapid and reliable supply of the connecting elements to the processing apparatus. Any interference with the supply leads to a retardation of the production process and sometimes to costly maintenance operations, and therefore causes considerable costs. A rapid supply of connecting elements suffers, in many applications, from the circumstance that the processing apparatus, whether stationary or guided by a robot, is in a production cell, while the supply apparatus with individuation and supply container is outside the cell and connected to the processing apparatus by way of a comparatively long supply tube. Such an arrangement is especially unfavorable when the system is designed for simultaneous processing of two different connecting elements. On the supply unit, there is then a switch which guides the connecting element variant required in each instance for the next processing operation into the supply tube. If for reasons of control the call for the next connecting element is transmitted to the supply unit very late, undesirably long cycles result from the long supply tube.

EP 0,922,538 B1 discloses a method in which a connecting element in the form of a self-piercing rivet having a head and a shank offset from the head is supplied by a supply unit through a passage of a loading device arranged at the self-piercing riveter. The passage has a T-shaped cross-section, substantially corresponding to the projected area of the rivet. The rivet is here supplied to the passage with longitudinal axis directed transverse to the direction of travel, and individually transported through the passage to the loading device by means of air. In the direction of loading, the self-piercing rivet supplied is braked and held in an initial position suitable for the operation with the aid of movable positioning segments and a locking element. This known method and the devices disclosed in the document for the purpose have proved successful in practice. In the case of rapid cycles and long transmission routes, however, the duration of direct individual supply of connecting elements by the supply unit proves disadvantageous.

In a method disclosed by EP 0,511,093 B1 for conditioning and delivering small cylindrical parts, such as screws or rivets, the parts are arranged in the same direction, with the shank forward, in a column in a cylindrical supply tube, provided at the top with an opening for feeding with parts and a compressed air entrance and an exit below, associated with a means for intermittent delivery of the parts. The cylindrical tube is annularly arranged in several turns inside a rigid container forming a magazine in which a large number of parts are stored. The inside diameter of the tube is greater in a certain ratio than the greatest diameter of the parts, so that a stream of air by which the parts are driven ahead towards the exit along the tube can flow past the parts to the exit end. This known method has the disadvantage that it requires a comparatively large space near the processing apparatus. Besides, the energy required to transport the parts is relatively large, since in each delivery of a part, the entire column of many parts must be moved. Short-time exchange between parts of different lengths is not readily possible.

A device for supplying rivets to a self-piercing rivet tongs is disclosed by DE 10,064,241 A1. In this known device, the rivets are singly arranged one behind another in a tubular magazine, the magazine being acted upon by compressed air and so dimensioned that a small stream of compressed air can flow past the rivets towards the anterior end of the magazine. At the anterior end of the magazine, there is a means of rivet individuation and delivery consisting of a slide having a rivet-receiving opening slidable to and fro on the tongs transverse to the principal extent of the magazine between a first position for accepting a rivet from the magazine and a second position for delivering the accepted rivet to the tongs. To remove the rivet from the opening of the slide, it is acted upon in the second position of the slide by compressed air, advancing the rivet into a rivet-receiving opening of the tongs and holding it there by negative pressure generated at the anterior end of the ram by way of a bore through it. After transfer of the rivet, to perform a riveting operation the tubular magazine and the means of individuation and delivery pass from a rivet delivery position into a riveting position, in which the head of the rivet tongs is exposed. This known device is costly. A short-time exchange between two rivet versions is not possible.

The object of the invention is to specify a method of the kind initially mentioned that makes possible the feeding of the connecting elements to a processing apparatus in a short time and distinguished by a reliable and trouble-free mode of operation. It is also to be possible to supply at least two different connecting elements within a short time. Another object of the invention is to create a device suitable for operation of the method.

In the method according to the invention, the conveyance of the connecting elements takes place in two steps separate from each other, a first conveyance step in which the connecting elements are individually conveyed from a supply unit into an intermediate reservoir in the neighborhood of the loading means, and a second step in which an individual connecting element is conveyed from the intermediate reservoir into the loading device of the processing unit, at least two like or unlike connecting elements being picked up from the intermediate reservoir, and an arbitrary one of the connecting elements picked up from the intermediate reservoir, being selected and supplied by the process in the second step. By the method according to the invention, the supply time governing the cycle is considerably reduced, so that only the second step has an effect on the length of the cycle, and the period of the second step, owing to the arrangement of the intermediate reservoir on the processing unit near the loading means, is extraordinarily short. Even with delayed supply commands, a short timing can be realized. The first step in the method according to the invention expediently occurs depending on the fill level of the intermediate reservoir, i.e. immediately in each instance when the execution of a second step withdrew a connecting element from the intermediate reservoir. There is then enough time available to refill the emptied storage space, since the first step can be executed simultaneously with a processing step, the disadvantage of a long conveyance passage is therefore no longer a problem, and a late call for the second step is actually of advantage to the available time window.

The method according to the invention has the further advantage that with at least two different connecting elements, the order in which the several connecting elements are supplied to the processing unit may be random, and the connecting element variant to be supplied need not be determined until just before initiation of the second step. Since the intermediate reservoir at any time contains only one connecting element of each variant to be supplied, it may be of comparatively light and compact construction. The interference contour and weight of the processing unit are therefore not especially encumbered by the intermediate reservoir.

The device for supplying connecting elements to a processing unit, according to the invention, comprises an intermediate reservoir preceding the loading device of the processing unit, arranged to accommodate at least two connecting elements supplied through the passage and having at least two storage chambers, each having an entrance opening and an exit opening, the segment of the passage leading to an arbitrary one of the entrance openings and the segment of the passage leading to the loading device being connectable to an arbitrary one of the exit openings. Owing to the conformation according to the invention, each storage chamber of the intermediate reservoir can be supplied with a connecting element via the passage in any sequence, and any one of the stored connecting elements can be taken from a storage chamber and supplied to the operating unit. Preferably the intermediate reservoir is configured to accommodate at least two different connecting elements, for example of different lengths. The connection desired in each instance between the entrance and exit openings and the segments of the passage associated with them can be effected for example by a slide control, in which the passage openings are moved relative to the openings of the storage chambers. Another possibility consists in that switch-controlled branchings or passage segments movable relative to the chamber openings are arranged between the chamber and the passage openings.

In a preferred embodiment of the intermediate reservoir, according to the invention, the storage chambers are arranged side-by-side in a chamber housing, the entrance openings and the exit openings being located on opposed sides of the chamber housing and the chamber housing being movable to and fro between two placements in a housing, a first chamber and a second chamber being connected with the connecting openings provided for the passage in the housing of the intermediate reservoir. This conformation of the intermediate reservoir is simple and inexpensive to produce, and ensures a reliable mode of operation. To move the chamber housing, preferably a double-action pneumatic cylinder is provided.

Another contribution to the simplification of the intermediate reservoir is that the entrance opening and the exit opening of a reservoir chamber are connectable simultaneously to the associated segment of the passage in each instance. So that a connecting element supplied to the intermediate reservoir can here be held back in the intermediate reservoir, the exit opening is closable by means of a controllable barrier, preferably arranged in the housing of the intermediate reservoir. To actuate the barrier, a double-action pneumatic cylinder may be provided. The chamber housing may advantageously be configured as a slide of rectangular shape, lodged movable lengthwise in a prism-shaped opening in the housing of the intermediate reservoir and penetrated by the storage chambers transverse to its direction of motion. It is expedient further if, in the storage chambers behind the entrance openings in the direction of conveyance, latches are arranged that permit a motion of the connecting elements in forward direction and block it in the opposed direction.

To convey the connecting elements located in the intermediate reservoir to the loading device, a nozzle opening into the passage may be provided for the supply of blown air in the housing of the intermediate reservoir, and be so arranged that the jet of blown air leaving the nozzle is directed into the entrance opening of the storage chamber connected to the passage at the time. This conformation has the advantage that no blown air openings are required on the movable chamber housing. Besides, with the help of this blown air supply, the motion of supplied connecting elements passing the latch can be supported, and any connecting elements can be prevented from getting stuck in the vicinity of the latch.

So that the presence of connecting elements in the storage chambers can be monitored, sensors are arranged on the storage chambers whose signals serve to control the supply of connecting elements and the individual steps. As an alternative, sensors may be arranged in the connection openings, which produce a signal when a connecting element passes through. Other sensors detecting when a connecting element leaves the supply unit are preferably provided on the latter. These sensors make possible a simple and reliable control of the supply process and an early recognition of trouble. As sensors, electromechanical, electromagnetic and optical sensors are available.

BRIEF DESCRIPTION OF THE DRAWINGS

The invention will now be illustrated in more detail in terms of an embodiment represented in the drawing by way of example. In the drawing.

DETAILED DESCRIPTION

Figure 1:
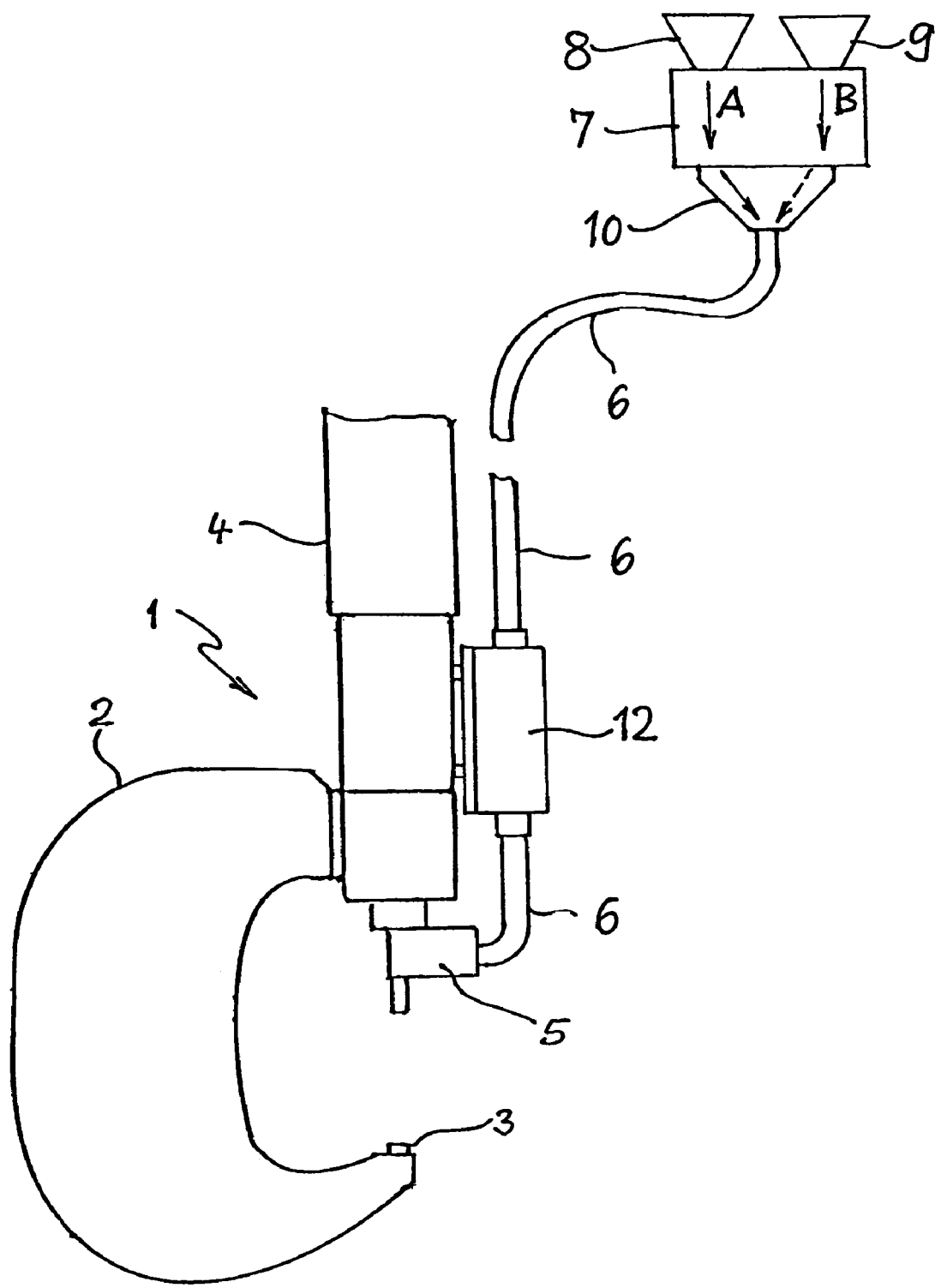
FIG. 1 shows a riveting apparatus having a device for supplying self-piercing rivets.

FIG. 1 shows a processing apparatus 1 intended for processing self-piercing rivets. Self-piercing rivets serve to connect sheet metal parts. They are pressed by a ram with great force from one side into the stacked metal sheets, the sheets being supported on a die forming an abutment. For this purpose, the processing apparatus 1 comprises a C-shaped bow 2, bearing a die 3 at one end and a housing 4 at the opposed end, in which a ram movable against the die 3 and a device for driving the ram are arranged. To supply self-piercing rivets, there is a loading device 5 on the processing apparatus 1, to which self-piercing rivets placed in readiness by a supply unit 7 are supplied by way of a passage 6. The passage 6 consists in part of a yielding tube of synthetic material, in some applications bridging a distance of several meters between the supply unit 7 and the processing unit 1.

The supply unit 7 comprises two supply containers 8, 9, serving to store two different self-piercing rivets A, B, differing from each other in length for example. A controllable switch 10 on the supply unit 7 makes sure that in each instance the conveyed self-piercing rivet A or B, as the case may be, is supplied to the passage 6. Alternatively, two separate supply units may be provided, whose exits are connected to the controlled switch 10.

Figure 2:
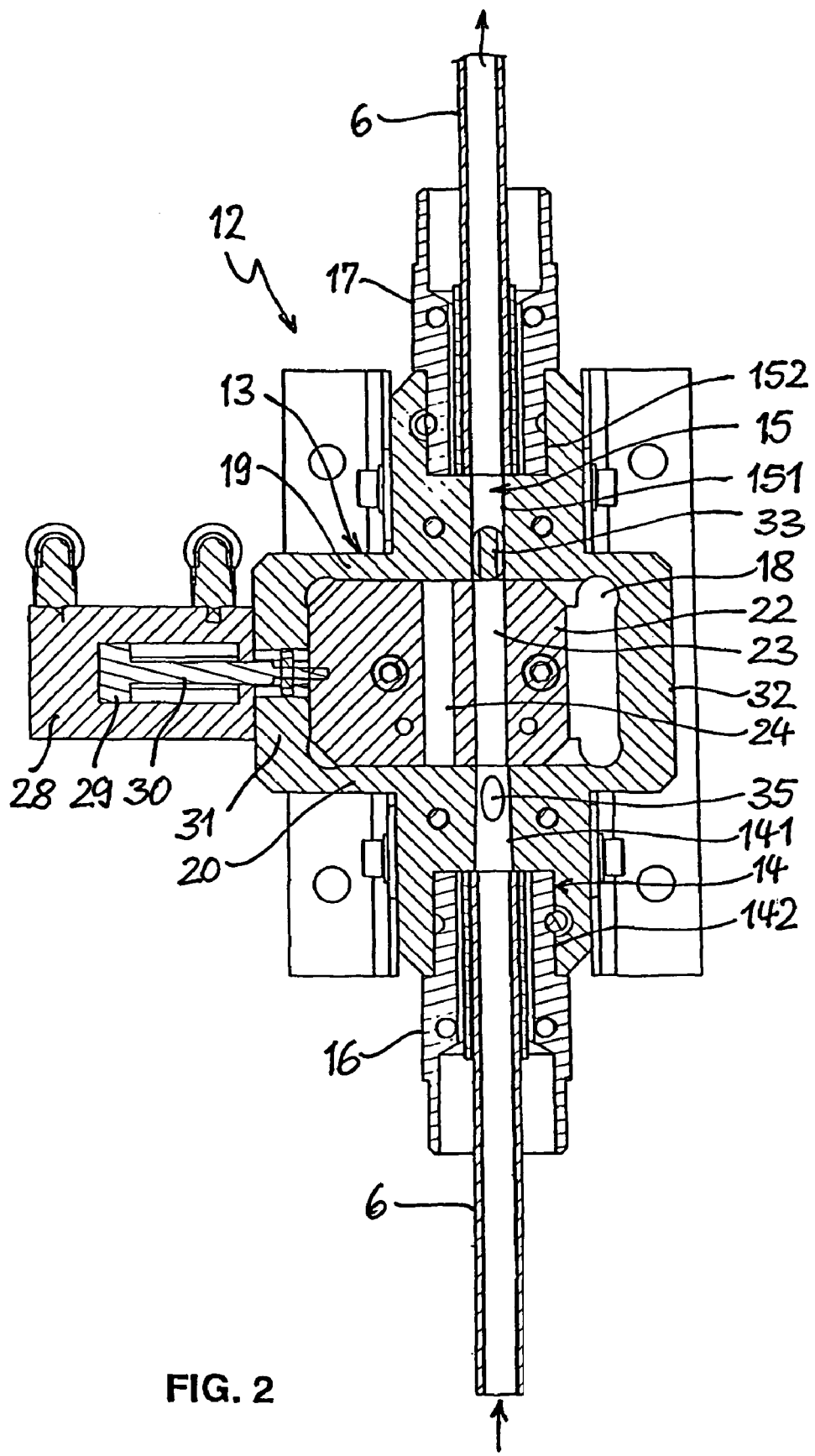
FIG. 2 shows a cross-section of an interim storage.
Figure 3:
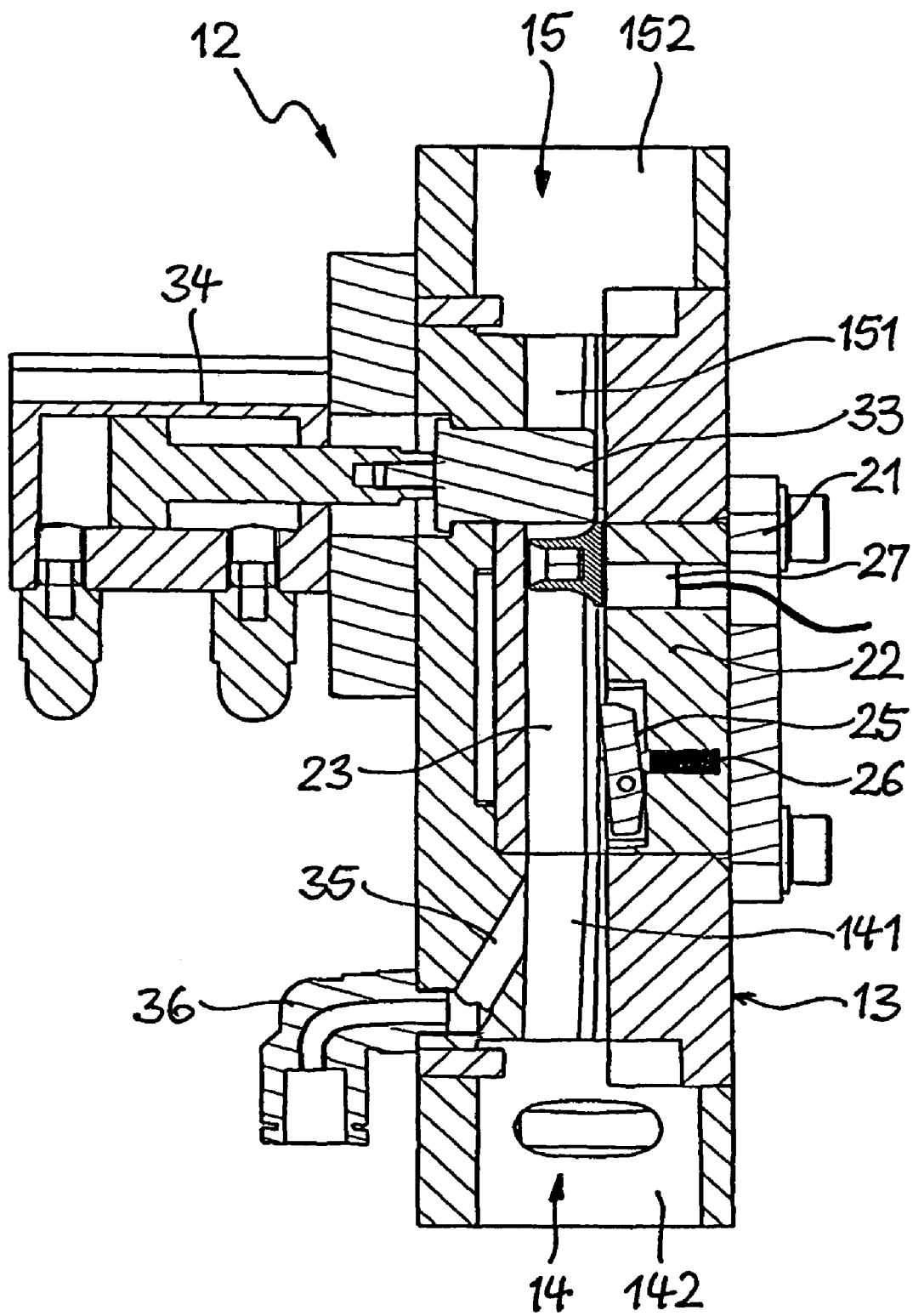
FIG. 3 shows a cross-section of the interim storage in a plane perpendicular to the cross-section of FIG. 2.

In the vicinity of the loading device 5, there is an interim reservoir 12 in the passage 6, fastened to the housing 4 of the processing unit 1. As may be seen in FIGS. 2 and 3, the interim reservoir 12 comprises a storage housing 13 having connection openings 14, 15 on opposed sides for the segments of the passage 6. The connection openings 14, 15 have a common longitudinal axis and consist of passage segments 141, 151 and fastening segments 142, 152, comprising fastening sleeves 16, 17. With fastening sleeve 16, the tube of passage 6 is fastened to the storage housing 13. The fastening sleeve 17 fastens the segment of passage 6 leading to the loading device 5, provided with a means of length equalization, for example a telescoping tube, if the loading device 5 is movable relative to the interim reservoir 12.

The storage housing 13 has a central prism-shaped recess 18 with mutually opposed walls 19, 20, into which the connection openings 14, 15 open. The recess 18 is closed on top by a lid 21. In the recess 18, a prism-shaped chamber housing 22 is arranged, movable to and fro in lengthwise direction of the walls 19, 20 between two positions. The chamber housing 22 contains two storage chambers 23, 24 arranged side-by-side, having the cross-sectional profile of the passage 6 and completely penetrating the chamber housing 22. The storage chambers 23, 24 are so arranged that in the one position of the chamber housing 22 shown in FIG. 2, the storage chamber 23 is aligned with the passage segments 141, 151 of the junction openings 14, 15, and the storage chamber 24 in the other position. The openings of the storage chambers 23, 24 facing the wall 19 form entrance openings, and the openings of the storage chambers 23, 24 facing the wall 20 form exit openings. On the top of the storage chambers 23, 24, there is a latch 25 projecting at one end into the particular storage chamber 23 or 24 as the case may be, and capable of being forced out of the storage chamber 23 or 24 against the force of a spring 26. The latches 25 are so arranged that they permit a motion of a self-piercing rivet in the direction of the outlet openings and block it in the opposed direction. In the neighborhood of the outlet openings, each storage chamber 23, 24 in a bore contains a sensor 27 whose cable passes out through a slit in the lid 21. With the aid of the sensors 27, the presence of self-piercing rivets in the storage chambers 23, 24 can be detected. The motion of the chamber housing 22 is effected by a double-action pneumatic cylinder 28 fastened to the storage housing 13 whose piston 29 is connected to the chamber housing 22 by a piston rod 30. The two positions of the chamber housing 22 are defined by transverse walls 31, 32 of the reservoir housing 13, against which the chamber housing 22 strikes in each instance.

The interim reservoir 12 comprises a shut-off slide 33 actuable by means of a double-action pneumatic cylinder 34. The shut-off slide 33 is arranged in an opening leading laterally into a passage segment 151 and, in the locking position shown in FIG. 3, projects into the passage segment 151. In the open position, the shut-off slide 33 is completely retracted from the passage segment 151, so that a self-piercing rivet can pass the passage segment 151 without hindrance. In the bottom of the passage segment 141, a nozzle 35 configured in the reservoir housing 13 opens, in communication with a nipple 36 for connection of a blown air line. The nozzle opening 35 is inclined in the direction of conveyance, so that a blown jet of air exiting from it is directed into the entrance opening of the particular connected reservoir chamber 23, 24.

In the following, the mode of operation of the supply unit 7 and the interim reservoir 12 will be described in more detail. On commencement of operation, first the sensors 27 are used to inquire whether self-piercing rivets are present in the storage chambers 23, 24. If this is not the case, then the storage chambers 23, 24 must first be loaded. For this purpose, the slide 33 is moved into the closing position, and the chamber housing 22 into the desired position for loading a rivet A, in which position for example the storage chamber 23 is in connection with the openings 14, 15. As soon as this has been done, the supply unit 7 is prompted to perform a first conveyance step for the self-piercing rivet A. The supply unit 7 individuates a rivet A, guides it through the switch 10 into the passage 6, and drives it with blown air into the connected storage chamber 23, where rivet A, after it has passed the latch 25, is held back at the outlet opening of the storage chamber 23 by the slide 33. The presence of the rivet A is detected by the sensor 27 and communicated to a controller (not shown). This terminates the operation, and initiates the loading of the storage chamber 24 with a self-piercing rivet B. The chamber housing 22 is moved for this purpose into the second position, in which the storage chamber 24 is in communication with the opening 14. Then the first step is repeated as described with a self-piercing rivet B.

After both storage chambers 23, 24 have each been loaded with a self-piercing rivet, and this condition has been reported to the controller by the sensors 27, the controller can initiate a cycle of operations. The process controller then instructs a supply controller as to which self-piercing rivet variant, A or B, is to be supplied. If it is self-piercing rivet B, then no displacement of the chamber housing 22 is required, since the storage chamber 24 containing self-piercing rivet B is in junction position. If a rivet A is to be supplied, then the chamber housing 22 is moved into the other position. Execution of the second step with rivet B merely runs the slide 33 into the open position, and a supply of blown air by the nozzle opening 35 puts the rivet B through the junction opening 15 and the passage 6 connected thereto to the loading device. After a short time interval X, at which the self-piercing rivet B will in any case be located in the loading device, the supply of blown air to the nozzle opening 35 shuts off again, and the slide 33 is run back into the closed position. At the same time, likewise time-controlled, the operation of the processing apparatus is started.

After completion of Step 2, slide 33 and chamber housing 22 hold their position while the self-piercing rivet B, now absent in storage chamber 24, signals to the controller that in a renewed first step, a rivet B is again to be loaded in the storage chamber 24. Thus the first step is to be repeated at once as described above with a new rivet B, so that before completion of the processing step, both storage chambers 23, 24 are filled again. For the next processing step, therefore, in a short time a new rivet A or B can be supplied in a second step. The device described permits a reliable delivery of self-piercing rivets of different lengths into the loading device of a processor, and by dividing the delivery into two independent steps, provides for a short cycle and correspondingly high operating speed of the processor.

The invention claimed is:

1. A riveting device comprising:
   a rivet;
   a processing head including a rivet-setting ram;
   a rivet-reservoir including at least a first rivet-storage chamber and a second rivet-storage chamber, the reservoir being affixed to and moveable with the processing head;
   a sensor associated with at least one of the chambers operably detecting presence of the rivet in the associated chamber; and
   an elongated passage coupling the reservoir to the processing head, the chambers being moveable to a position aligned with the passage.

2. The device of claim 1, further comprising an automatically powered actuator operably moving the chambers to the aligned position.

3. The device of claim 2, wherein the actuator is a pneumatic cylinder.

4. A riveting device comprising:
a processing head including a rivet-setting ram;
a rivet-reservoir including at least a first rivet-storage chamber and a second rivet-storage chamber, the reservoir being affixed to and moveable with the processing head:
an elongated passage coupling the reservoir to the processing head, the chambers being moveable to a position aligned with the passage; and
a moveable barrier operably closing an exit opening of at least one of the chambers.

5. The device of claim 1, further comprising a substantially prism-shaped slide movable lengthwise in substantially a prism-shaped recess in the reservoir and penetrated transverse to its direction of motion by the storage chambers.

6. The device of claim 1, further comprising a nozzle operably supplying a jet of blown air directed into an entrance opening of the particular storage chamber connected to the passage.

7. The device of claim 4, further comprising a rivet, and a sensor associated with at least one of the chambers operably detecting presence of the rivet in the associated chamber.

8. A riveting device comprising:
a processing head including a rivet-setting ram;
a rivet-reservoir including at least a first rivet-storage chamber and a second rivet-storage chamber, the reservoir being affixed to and moveable with the processing head;
an elongated passage coupling the reservoir to the processing head, the chambers being moveable to a position aligned with the passage;
a C-frame having a first end and an opposite second end, the processing head being mounted to the first end;
a die mounted to the second end; and
a self-piercing rivet set by the ram and die.

9. A riveting device comprising:
a processing head including a rivet-setting ram;
a rivet-reservoir including at least a first rivet-storage chamber and a second rivet-storage chamber, the reservoir being affixed to and moveable with the processing head:
an elongated passage coupling the reservoir to the processing head, the chambers being moveable to a position aligned with the passage;
a die; and
a self-piercing rivet set by the ram and die, the ram linearly moving during rivet setting.

10. A riveting device comprising:
a processing head including a rivet-setting driver;
a rivet-reservoir including at least a first rivet-storage chamber and a second rivet-storage chamber, the reservoir being affixed to and moveable with the processing head;
an elongated passage coupling the reservoir to the processing head, the chambers being moveable to a position aligned with the passage; and
a substantially prism-shaped slide movable lengthwise in substantially prism-shaped recess in the reservoir and penetrated transverse to its direction of motion by the storage chambers.

11. The device of claim 10, further comprising an automatically powered actuator operably moving the chambers to the aligned position.

12. The device of claim 11, wherein the actuator is a pneumatic cylinder.

13. The device of claim 10, further comprising a moveable barrier operably closing an exit opening of at least one of the chambers.

14. The device of claim 10, further comprising a nozzle operably supplying a jet of blown air directed into an entrance opening of the particular storage chamber connected to the passage.

15. The device of claim 10, further comprising a rivet and a sensor associated with at least one of the chambers operably detecting presence of the rivet in the associated chamber.

16. The device of claim 4, further comprising an automatically powered actuator operably moving the chambers to the aligned position.

17. The device of claim 16, wherein the actuator is a pneumatic cylinder.

18. The device of claim 8, further comprising a moveable barrier operably closing an exit opening of at least one of the chambers.

19. The device of claim 8, further comprising an automatically powered actuator operably moving the chambers to the aligned position.

20. The device of claim 19, wherein the actuator is a pneumatic cylinder.

21. The device of claim 8, further comprising sensors operably sensing whether rivets are present in the chambers.

22. The device of claim 9, further comprising an automatically powered actuator operably moving the chambers to the aligned position.

23. The device of claim 22, wherein the actuator is a pneumatic cylinder.

24. The device of claim 9, further comprising a moveable barrier operably closing an exit opening of at least one of the chambers.

25. The device of claim 9, further comprising sensors operably sensing whether rivets are present in the chambers.

26. The device of claim 25, further comprising a slide automatically moveable to allow access to the chambers depending on the sensed condition.

27. A riveting device comprising:
a processing head including a rivet-setting ram;
a rivet-reservoir including at least a first rivet-storage chamber and a second rivet-storage chamber;
a passage coupling the reservoir to the processing head, the chambers being moveable to a position aligned with the passage;
a C-frame having a first end and an opposite second end, the processing head being mounted adjacent the first end;
a die mounted adjacent the second end;
self-piercing rivets set by the ram and die;
an automatically powered actuator linearly moving the chambers to the aligned position within the rivet-reservoir in response to a controller signal;
at least one sensor sensing whether the rivet is present in at least one of the chambers, the chambers being moved by the actuator depending on a sensed condition;
a first supply container containing a first set of the self-piercing rivets; and a second supply container containing a second set of the self-piercing rivets having a different characteristic than that of the first set, the first and second sets of rivets being air blown to the rivet-reservoir.

28. The device of claim 27, wherein the rivet characteristic is rivet length.

29. The device of claim 27, further comprising a spring-biased latch deterring backwards movement of at least one of the self-piercing rivets in at least one of the chambers.

\* \* \* \* \*